L. F. BAASH.
TWO-PRONG COMPOUND FISHING TOOL.
APPLICATION FILED MAY 8, 1916.
1,213,574.
Patented Jan. 23, 1917.
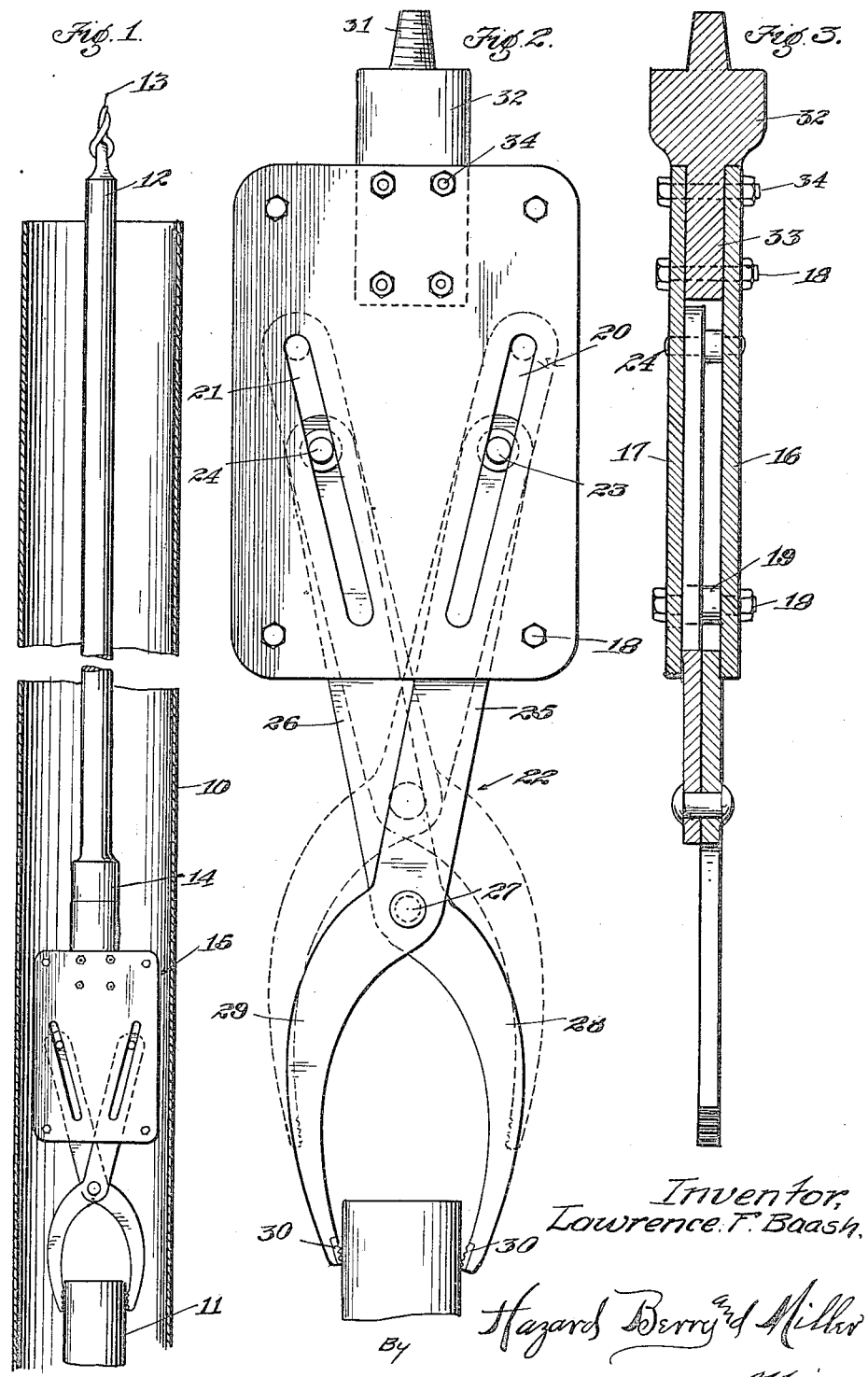
Inventor,
Lawrence. F. Baash,
By Hazard Berry and Miller
attys.

UNITED STATES PATENT OFFICE.

LAWRENCE F. BAASH, OF FILLMORE, CALIFORNIA, ASSIGNOR OF ONE-HALF TO TAY-PIKE COMPANY, OF LOS ANGELES, CALIFORNIA, A CORPORATION OF CALIFORNIA.

TWO-PRONG COMPOUND FISHING-TOOL.

1,213,574.  Specification of Letters Patent.  Patented Jan. 23, 1917.

Application filed May 8, 1916.  Serial No. 96,257.

*To all whom it may concern:*

Be it known that I, LAWRENCE F. BAASH, a subject of the Emperor of Germany, residing at Fillmore, in the county of Ventura and State of California, have invented new and useful Improvements in Two-Prong Compound Fishing-Tools, of which the following is a specification.

My invention relates to a fishing tool and pertains particularly to a device for use in the well boring industry as a means for recovering boring bars and the like from well shafts.

It is an object of this invention to provide a fishing tool for positively engaging rods, tools, and casings automatically, irrespective of the remoteness of said part from the surface of the ground and in a well shaft.

Another object is to provide a tool which will be so constructed that the grip produced will automatically increase in a direct ratio to the force of the pull upon the elevating medium.

A further object is to provide a device of the above character which will be adapted to pass through a small opening and engage an object of larger relative size than the opening through which said device passed.

Another object is to provide a fishing tool which is so constructed that a compounded force will be applied to the gripping jaws.

Other objects will appear hereinafter.

The invention is illustrated in the accompanying drawings in which:

Figure 1 is a view illustrating the operation of my device within a well casing. Fig. 2 is an enlarged view in side elevation of a fishing tool and shows it in engagement with an object, a dotted line position being illustrated to indicate the inoperative position of the open jaws. Fig. 3 is a view in vertical section taken along the line 3—3 of Fig. 2 and shows the construction in detail.

Referring to the drawings, 10 indicates a well casing or shaft extending a distance into the ground and having a tool or boring bar 11 disengaged from a well rig and resting adjacent the lower end of said casing.

Referring to Fig. 1, I have shown an elevating rod 12 as depending from a hoisting rope 13 and into shaft 10. Mounted at the lower end of said rod 12 by means of a threaded socket 14 is my fishing tool, indicated by the numeral 15 shown in operative engagement with the member 11. The fishing tool 15 is composed of a pair of parallel plates 16 and 17, said plates being substantially rectangular in shape and of a like size. Bolts 18 are used to hold the plates together, said bolts being formed at their centers with an enlarged spacing portion 19 adapted to hold the plates 16 and 17 a distance from each other and at the same time fixedly secure them. The plates 16 and 17 are formed with a pair of slots 20 and 21, said slots being complementary and lying at an equal angle to the longitudinal center of the plates and having their lowermost ends adjacent each other. Disposed between said plates is a pair of gripping tongs 22, said tongs being formed at their operative or pressure ends to accommodate slot engaging studs 23 and 24. Said studs are adapted to seat within the complementary slots 20 and 21 and move freely therealong. The pressure members 25 and 26 converge and are pivoted upon a pivot pin 27. The extended portions therefrom are arcuately shaped into grip members 28 and 29 and terminate in grip portions 30. I have here shown the grip portions as being demountable and held in any suitable manner. It is evident, however, that they may be formed in one piece, or that the serrations, of which the portions 30 are formed, be made upon the engaging face of the jaw itself instead of upon a demountable piece of metal.

The entire fishing tool is connected to the threaded socket 14 of the rod 12 by means of a screw member 31 which is formed integral with its mounting 32. The mounting 32 terminates within a rectangular portion 33 of a width which corresponds to the space between the two plate members 16 and 17. Bolts 34 are provided to secure the member 32 in its position with its center upon the longitudinal center of the plates.

In the operation of this device, when an object of any shape has been disconnected from its anchorage and lies at the bottom of a well shaft, the tool 15 is lowered upon the end of the bar 12 by means of a rope or cable 13. When the jaws 28 and 29 encounter the object, the weight of the plates 16 and 17 will force them open by means of the pins 23 and 24 which will be thrust upwardly to the ends of the slots 20 and 21 as shown in Fig. 2. When the pins 23 and 24 are in this position, the jaws are opened to their maximum width. As the bar 12 is raised the weight of the grip member 22 will draw the ends of the handle members 25 and 26 downwardly and force the pins 23 and 24 along the slots 20 and 21 in a downward direction and toward each other. This action will cause the tongs to act scissor fashion and swing the jaws 28 and 29 together. The serrated grip portions 30 will then engage the sides of the member 11 and as the device is further raised, the resistance offered by the member 11 will act to further wedge the pins 23 and 24 downwardly and toward each other along their slots. This produces an increased grip upon the article and combines the lever movement common in tongs and pliers with the wedging action produced by the coaction of the pins 23 and 24 and their slots.

It will thus be seen that I have provided a fishing tool which is of simple construction, will automatically and positively engage an object of any shape, and will exert a compounded force thereupon to grip the object and hold it while being removed from the well shaft.

I claim:

1. In a fishing tool, a pair of plates, means for securing said plates in spaced relation to each other, complementary slots formed through each of said plates, said slots converging toward each other at their lower ends, a pair of tongs, a single pivot for said tongs, said pivot being movable in relation to said plates, said tongs being formed with coacting grip jaws at their outer ends and with operating handles at their opposite ends, said handles being each provided with a pin slidably mounted in said slots, and means for bodily raising or lowering said plates, whereby on the raising of said plates, the gripping jaws are gravitationally moved toward each other to firmly hold the object engaged between them.

2. In a fishing tool, the combination of a support provided with a pair of inclined slots converging toward each other at their lower ends, a pair of tongs suspended from said support, said tongs comprising a pair of coacting grip jaws at their lower ends and with operating handles at their upper ends, a single pivot for said tongs movable in relation to said support, pins on said handles slidably mounted in said slots, and means for bodily raising or lowering said support whereby on the raising of said support, the gripping jaws are gravitationally moved toward each other to hold the object engaged by them.

In testimony whereof I have signed my name to this specification.

LAWRENCE F. BAASH.